United States Patent
Corsini et al.

(10) Patent No.: US 10,664,149 B2
(45) Date of Patent: May 26, 2020

(54) METHOD FOR CONFIGURING A MOM DATA WAREHOUSE AND PROVIDING A UI TO THE MOM DATA WAREHOUSE CONFIGURATION AND COMPUTER READABLE MEDIUM

(71) Applicant: SIEMENS AKTIENGESELLSCHAFT, Munich (DE)

(72) Inventors: Giorgio Corsini, Genoa (IT); Giuliano Trifoglio, Genua (IT)

(73) Assignee: Siemens Aktiengesellschaft, Munich (DE)

( * ) Notice: Subject to any disclaimer, the term of this patent is extended or adjusted under 35 U.S.C. 154(b) by 12 days.

(21) Appl. No.: 15/640,738

(22) Filed: Jul. 3, 2017

(65) Prior Publication Data
US 2018/0004381 A1    Jan. 4, 2018

(30) Foreign Application Priority Data
Jul. 4, 2016 (EP) .................................. 16177818

(51) Int. Cl.
*G06F 3/048* (2013.01)
*G06F 3/0485* (2013.01)
(Continued)

(52) U.S. Cl.
CPC .......... *G06F 3/0485* (2013.01); *G06F 3/0482* (2013.01); *G06F 16/26* (2019.01);
(Continued)

(58) Field of Classification Search
CPC ......... G06F 17/30589; G06F 17/30592; G06F 3/0482; G06F 17/30572
See application file for complete search history.

(56) References Cited

U.S. PATENT DOCUMENTS 7,720,804 B2   5/2010  Fazal et al.
7,992,102 B1 *  8/2011  De Angelo .......... G06F 3/0482
                                                715/804
(Continued)

FOREIGN PATENT DOCUMENTS

EP    1843259 A2   10/2007
EP    2463790 A1    6/2012

OTHER PUBLICATIONS

Siemens "Simatic IT Production Suite V.6.6—Functional Overview" Apr. 2013; pp. 1-23 / Jan. 4, 2013.

*Primary Examiner* — Scott T Baderman
*Assistant Examiner* — Mario M Velez-Lopez
(74) *Attorney, Agent, or Firm* — Laurence Greenberg; Werner Stemer; Ralph Locher

(57) ABSTRACT

A method for configuring a manufacturing operation management (MOM) data warehouse and providing a user interface (UI) to the MOM data warehouse configuration. The MOM data warehouse forms a database for the data handled within a manufacturing execution system. The method includes: a) mapping the data that has to be presented in the UI into a hierarchical data model being based on an industry classification of the manufacturing process controlled by the manufacturing execution system, the hierarchical data model having a number of levels; b) mapping the hierarchical data model into a radial control based UI; c) displaying in the radial control based UI at least two levels of the hierarchical data model; and d) providing navigation actions in order to scroll up and/or scroll down through the levels of the hierarchical data model.

5 Claims, 5 Drawing Sheets

(51) Int. Cl.
  *G06F 16/28* (2019.01)
  *G06Q 10/06* (2012.01)
  *G06Q 50/04* (2012.01)
  *G06F 16/26* (2019.01)
  *G06F 3/0482* (2013.01)

(52) U.S. Cl.
  CPC .......... *G06F 16/282* (2019.01); *G06F 16/283* (2019.01); *G06Q 10/067* (2013.01); *G06Q 50/04* (2013.01); *Y02P 90/30* (2015.11)

(56) References Cited

U.S. PATENT DOCUMENTS

| | | | | |
|---|---|---|---|---|
| 8,237,714 B1* | 8/2012 | Burke | ...................... | G09B 5/00 345/440 |
| 8,281,027 B2* | 10/2012 | Martinez | ................. | H04L 67/18 709/231 |
| 2004/0024662 A1 | 2/2004 | Gray et al. | | |
| 2005/0044509 A1* | 2/2005 | Hunleth | ................ | G06F 3/0482 715/834 |
| 2006/0048076 A1* | 3/2006 | Vronay | ................ | G06F 3/0482 715/850 |
| 2008/0295037 A1* | 11/2008 | Cao | ....................... | G06F 3/0482 715/852 |
| 2008/0307369 A1 | 12/2008 | Liu et al. | | |
| 2010/0174591 A1* | 7/2010 | DeAngelo | ............. | G06F 3/0482 705/14.4 |
| 2010/0306702 A1* | 12/2010 | Warner | ................. | G06F 3/0482 715/811 |
| 2011/0047014 A1* | 2/2011 | De Angelo | ........... | G06F 3/0482 705/14.4 |
| 2012/0124520 A1* | 5/2012 | Samp | .................. | G06F 3/04886 715/834 |
| 2012/0151393 A1* | 6/2012 | Arndt | ................ | G06F 17/30604 715/765 |
| 2013/0339904 A1* | 12/2013 | Geithner | ............... | G06F 3/0482 715/834 |
| 2014/0059497 A1* | 2/2014 | Burckart | ............... | G06F 3/0482 715/854 |
| 2014/0365389 A1 | 12/2014 | Cheek et al. | | |
| 2014/0380210 A1* | 12/2014 | Blyumen | ............ | G06F 3/04842 715/763 |
| 2014/0380219 A1* | 12/2014 | Cartan | ................ | G06F 3/04842 715/771 |

\* cited by examiner

METHOD FOR CONFIGURING A MOM DATA WAREHOUSE AND PROVIDING A UI TO THE MOM DATA WAREHOUSE CONFIGURATION AND COMPUTER READABLE MEDIUM

CROSS-REFERENCE TO RELATED APPLICATION

This application claims the priority, under 35 U.S.C. § 119, of European application EP 16177818.8, filed Jul. 4, 2016; the prior application is herewith incorporated by reference in its entirety.

BACKGROUND OF THE INVENTION

Field of the Invention

The invention relates to a method for configuring a manufacturing operation management (MOM) data warehouse and providing a UI to the MOM data warehouse configuration in the field of a manufacturing execution system (MES). Most recently, the term manufacturing operation management (MOM) is more and more used to replace the term MES.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, the Siemens Corp. offers a broad range of MES/MOM products under its SIMATIC IT® product family.

In MES/MOM systems, different functions or manufacturing issues like those mentioned above are generally devoted to different components, which are often handled by different groups of people and on different machines. In such a situation, set-up and configuration problems arise. On the one hand each individual machine has different set-up requirements according to its specific configuration. This makes it impossible to easily identify the environment in which the machine is operating and the context of operation. On the other hand, each component may have a different configuration language, due to the customizability of set-up scripts, and this can involve incompatibility, overlapping and difficulty in expanding tasks with additional steps.

Thus, at present, when configuring a system of that kind, a separate script or configuration workflow is created for each individual machine, according to its configuration, and also the components are configured one at a time through a respective set-up script. Creating a separate script or configuration workflow for each target machine is a time-consuming process, due to the obligatory analysis phase, and more error prone, as required configurations could be omitted by mistake. Also individually configuring the different components takes a considerable amount of time.

All the resources, such as a machine, a person, a material, applied in the manufacturing process produce and/or use a huge amount of data. This data is managed and administrated in a so-called MOM data warehouse. This MOM data warehouse supports business decisions by collecting data from multiple MOM data sources, and consolidating, and organizing them for reporting and analysis purposes.

a) The design of a MOM Data warehouse database differs substantially from the design of an online transaction processing system (OLTP) database and requires several now described steps.

b) Gathering and filtering user requirements, i.e. the concepts and measures that are considered relevant for the manufacturing process, and the contexts representing the perspective for analyzing these measures.

c) Analyzing the info available in the MOM data sources and designing a conceptual hierarchical model for the MOM data warehouse, according to the chosen measures and contexts.

d) Designing the physical structure of the MOM data warehouse and the transformation logic to be applied when extracting data from the MOM data sources and loading it in the MOM data warehouse.

All these design steps are fundamental in the successful building of a MOM data warehouse and generally require highly skilled SW architects and a huge amount of time/resources to complete them.

This problem has been in general solved using one of the following described approaches.

i) The design of the MOM data warehouse is performed at "solution level". This approach is used in case of customer specific data warehouse design. The SW architect proceeds with the activities listed above (analysis of MOM data sources, design of the model, design of the physical structure). The final MOM Data Warehouse structure is strictly dependent on the architectural design decisions of the SW architect.

ii) The design of the MOM data warehouse is performed at "product level". This approach is used in case of general purpose data warehouse design. In this case, the MOM data warehouse cannot be optimized for every specific project, and very often tuning and customization activities are required.

SUMMARY OF THE INVENTION

It is therefore the objective of the present invention to provide a method to configure the MOM data warehouse starting from the user requirements and avoiding the technical/architectural data base design steps.

The objective is achieved according to the present invention by a method for configuring a MOM data warehouse and providing a UI to the MOM data warehouse configuration, the MOM data warehouse forming a database for at least part of the data handled within a manufacturing execution system. The method contains the steps of:

a) mapping the data that has to be presented in the UI into a hierarchical data model being based on an industry classification of the manufacturing process controlled by the manufacturing execution system; the hierarchical data model having a number of levels;

b) mapping the hierarchical data model into a radial control based UI;

c) displaying in the radial control based UI at least two levels of the hierarchical data model; and d) providing navigation actions in order to scroll up and/or scroll down through the levels of the hierarchical data model.

The method therefore allows to represent and manage a MOM data model hierarchy using a radial control (MOM function selector) with the goal that the radial control automatically configures the structure of the MOM data warehouse.

In order to represent the levels of the hierarchical data model in a self-explaining context to the user, the radial control based UI may contain an internal ring of radially separated ring segments at a data level N and an external ring of radially separated ring segments at a data level N+1 or N−1.

In order to improve the significance of the representation in the radial control based UI, the size and/or the position and/or the appearance of the separated ring segments in the internal ring and/or in the external ring are adjusted in dependency from the relevance of the data represented by the respective ring segment. This measure allows to highlight either by size and/or by position and/or appearance a pre-determinable separated ring segment.

A preferred embodiment of the afore-mentioned measure can be achieved when the relevance of the data is identified by the evaluation of a data criteria, preferably data criteria linked to the number of sub-leaves in the hierarchical data model and/or data criteria linked to current status of the manufacturing process and/or data criteria linked to the role of the user of the radial control based UI. Easy examples could be: the larger size of a separated ring segment for data that contains a high number of sub-leaves and/or the larger size of a separated ring segment for data that summarizes the OEE functionalities of a manufacturing process just completed and/or an amended color for a separated ring segment for data that is substantial to a technician doing the maintenance of a manufacturing line in a manufacturing facility.

Under certain circumstances it may happen that the number of ring segments to be displayed in the internal or external ring may exceed the capability of the representation in the radial control based UI. In order to cope with this situation a preferred embodiment of the present invention may provide a specific control, such two arrows, enabling the user to scroll the internal or external ring in a clockwise or counterclockwise direction, when the number of separated ring segments info to be displayed exceeds a maximum rendering capability thereby maintaining the data hierarchy when the internal and the external ring are kept synchronously.

Other features which are considered as characteristic for the invention are set forth in the appended claims.

Although the invention is illustrated and described herein as embodied in a method for configuring a MOM data warehouse and providing a UI to the MOM data warehouse configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The present invention lays in the technical field of manufacturing execution systems (MES/MOM). By way of non limiting example, reference will be made to the architecture of the SIMATIC IT (in short, SIT) system of Siemens Corporation.

SIMATIC IT is a collection of highly-integrated components, designed to integrate the systems within each factory, standardize production across the entire enterprise and keep manufacturing processes aligned with supply-chain activity. The core of this system is the SIMATIC IT Production Modeler (PM), which is an object-oriented graphical tool that enables the user to follow the entire lifecycle of a MES project. The PM is a modeling environment where the functions, belonging to different SIMATIC IT components, are combined graphically in order to explicitly define the execution logic (explicit-rules approach). An overview of the product can be found in the document "SIMATIC IT PRODUCTION SUITE V. 6.6—Functional Overview", April 2013, available on the website www.siemens.com.

Figure 2:
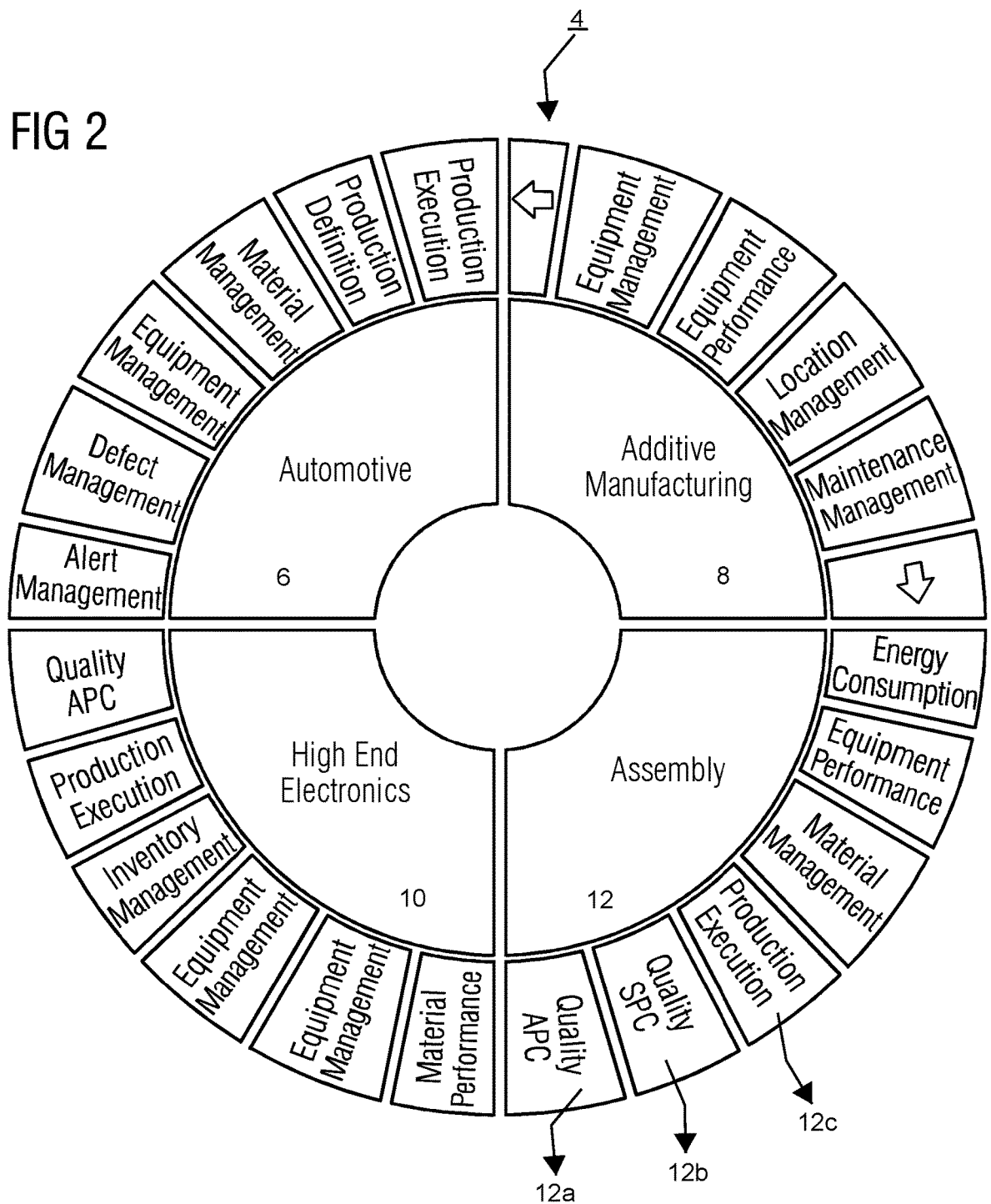
FIG. 2 is an illustration showing a mapping of a data model hierarchy into a radial control based user interface.

Given the amount of work inherent in MES systems, different functionalities and components of the system may be installed on different machines and may be handled by different groups of people. The invention aims at providing a simple, quick and effective configuration method for the data handling in order to create a MOM data warehouse and display the data contained in the MOM data warehouse at least partially to a user by means of a radial control based user interface (UI) as this is shown in FIG. 2.

Figure 1:
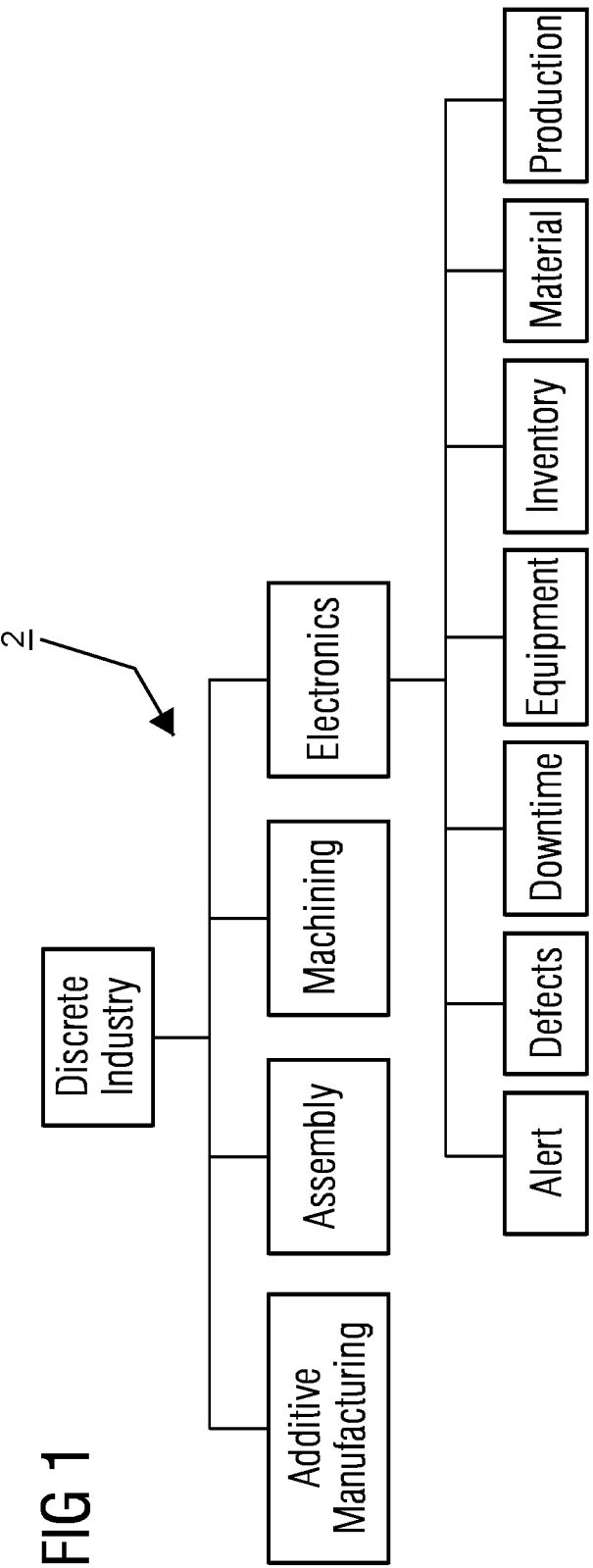
FIG. 1 is an illustration showing an example for an industry classification of a discrete industry sector.

FIG. 1 schematically shows an example for an industry classification 2 of the discrete industry sector. Typical representatives for the discrete industry sector are companies fabricating products by assembling components and subsystems into larger systems (e.g. automotive, aerospace, mechanical assembly). The structure of the industry classification is a hierarchical tree structure containing at level N the Discrete Industry root. Other possible roots at this level are Mass Manufacturing Industry, Food & Beverage, Pharmazeutical, Electronics and the like. At level N−1 are leaves like Additive Manufacturing, Assembly, Machining, Electronics. At the level N−2 one can find for the leaf Electronic the sub-leaves Alert, Defects, Downtime, Equipment, Inventory, Material, Production and the like.

When one starts now to configure a new MOM data warehouse and to provide a UI to the new MOM data warehouse wherein the new MOM data warehouse will form the database for all the data handled within a manufacturing execution system, each data object that is present somewhere within the environment of this industry classification has to be sorted into this scheme. In other words, the data that has to be presented in the UI has to be mapped into the hierarchical data model which is given by the industry classification of the manufacturing process controlled by the manufacturing execution system. Of course, it is possible that some of the data may also be assigned to more than one leaf of the hierarchical data model that contains usually a number of levels and a huge number of leaves and sub-leaves due to the huge amount of data typically handled by the manufacturing execution system.

Figure 3:
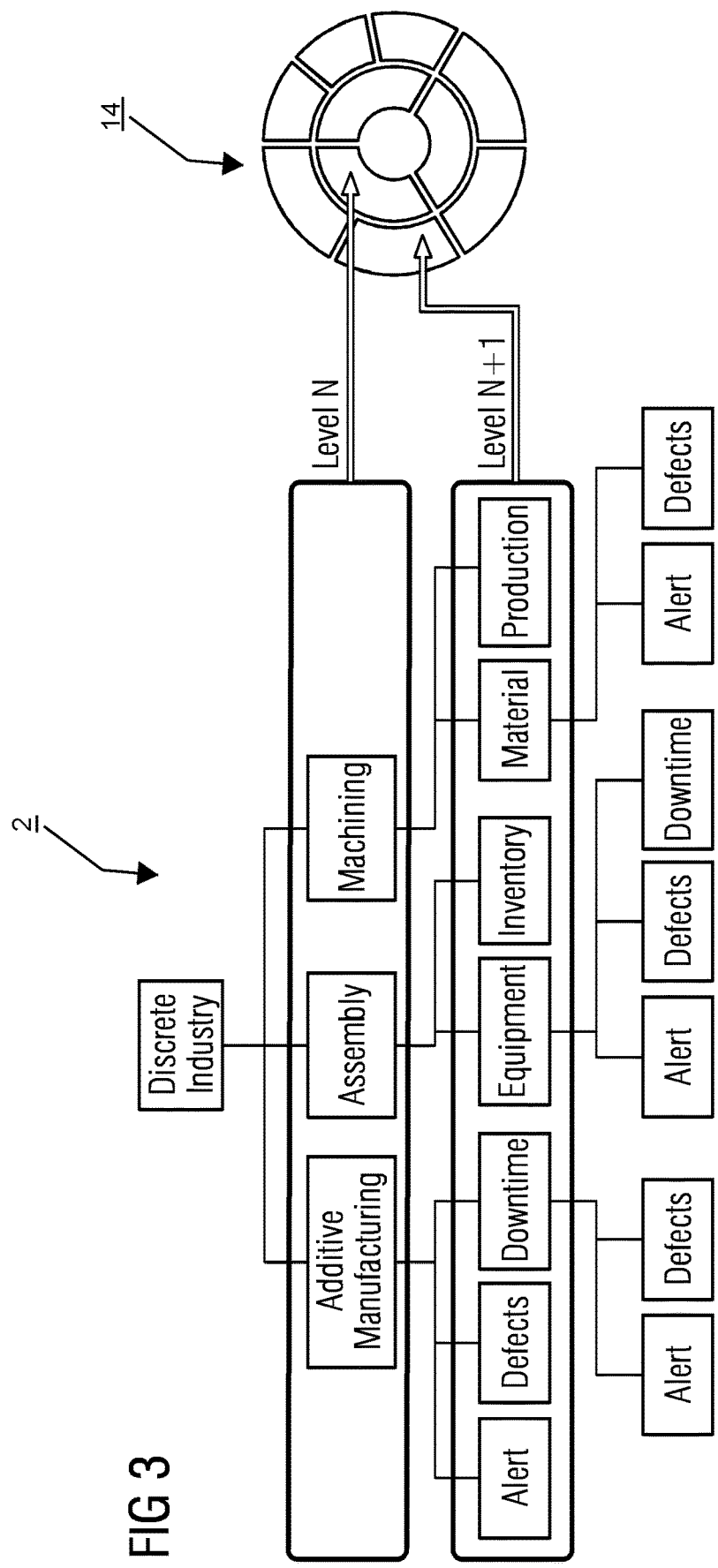
FIG. 3 is an illustration showing the mapping of two level of the data model hierarchy into a radial control based user interface.
Figure 5:
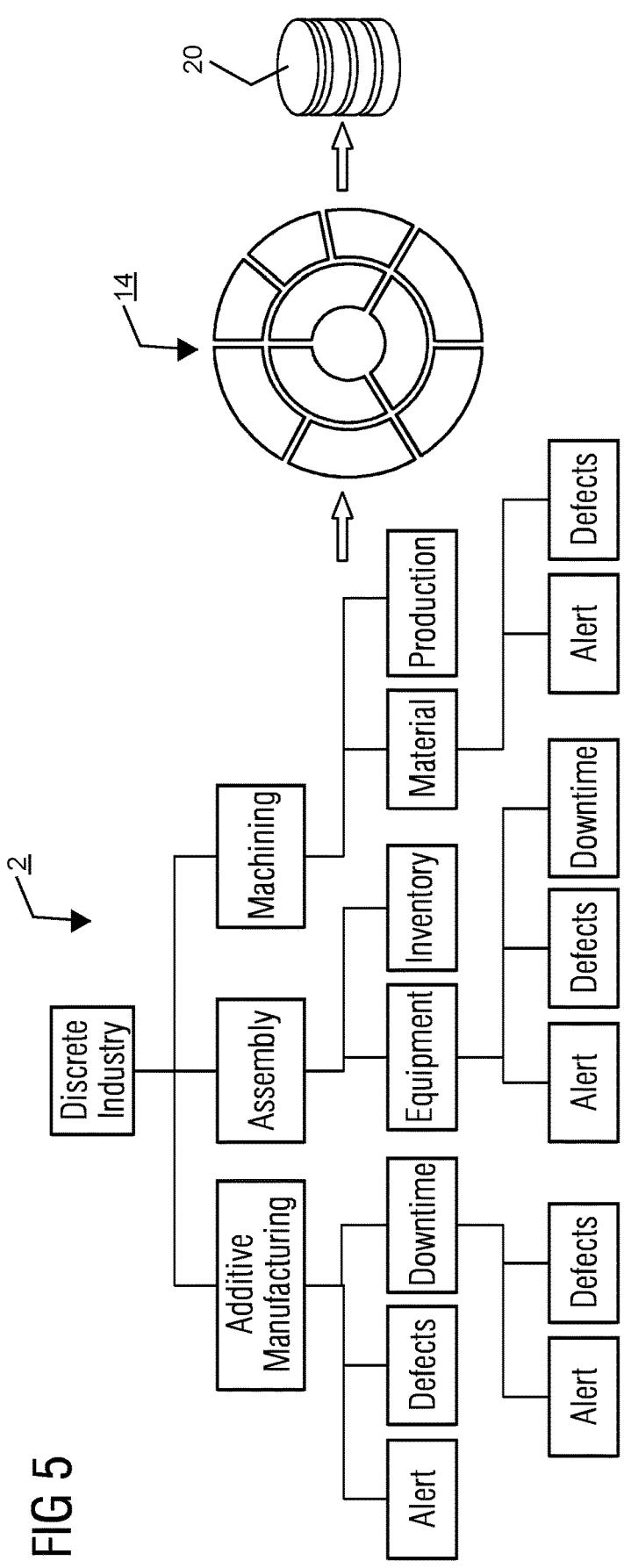
FIG. 5 is an illustration showing the mapping of various levels of the data model hierarchy into the radial control based user interface receiving its data from a database.

Once the hierarchical data model is created and the relevant data is mapped to the respective leaves of the hierarchical data model, this model is mapped into a radial control based UI. This implies that the data model is presented in a ring structure 4 having separated ring segments 6 to 12 each representing a leaf within the hierarchical data model as this is shown schematically in FIG. 2. Each ring segment 6 to 12 in the internal ring at level n, nε1, N, contains a number of sub-leaves being displayed in an external ring at level n−1. Ring element or leaf 12 contains for example sub-leaves 12a to 12c in the external ring. Each separated ring segment is a control that can be opened in order get more detailed information about the respective leaf, such as a current value, name of the variable behind, properties of the variable and the like. At least two levels of the hierarchical data model can be displayed in the radial control based UI. FIGS. 3 and 5 schematically illustrates the step of mapping the hierarchical data model according to the industry classification 2 into the radial control based UI 14. FIG. 5 additionally illustrates a database 20 behind which supplies data to and receives data and/or query commands from the radial control based UI 14.

The radial control based UI 14 can be displayed on any kind of computer system, such as master console, a client console, a PDA, a smart phone and the like.

Figure 4:
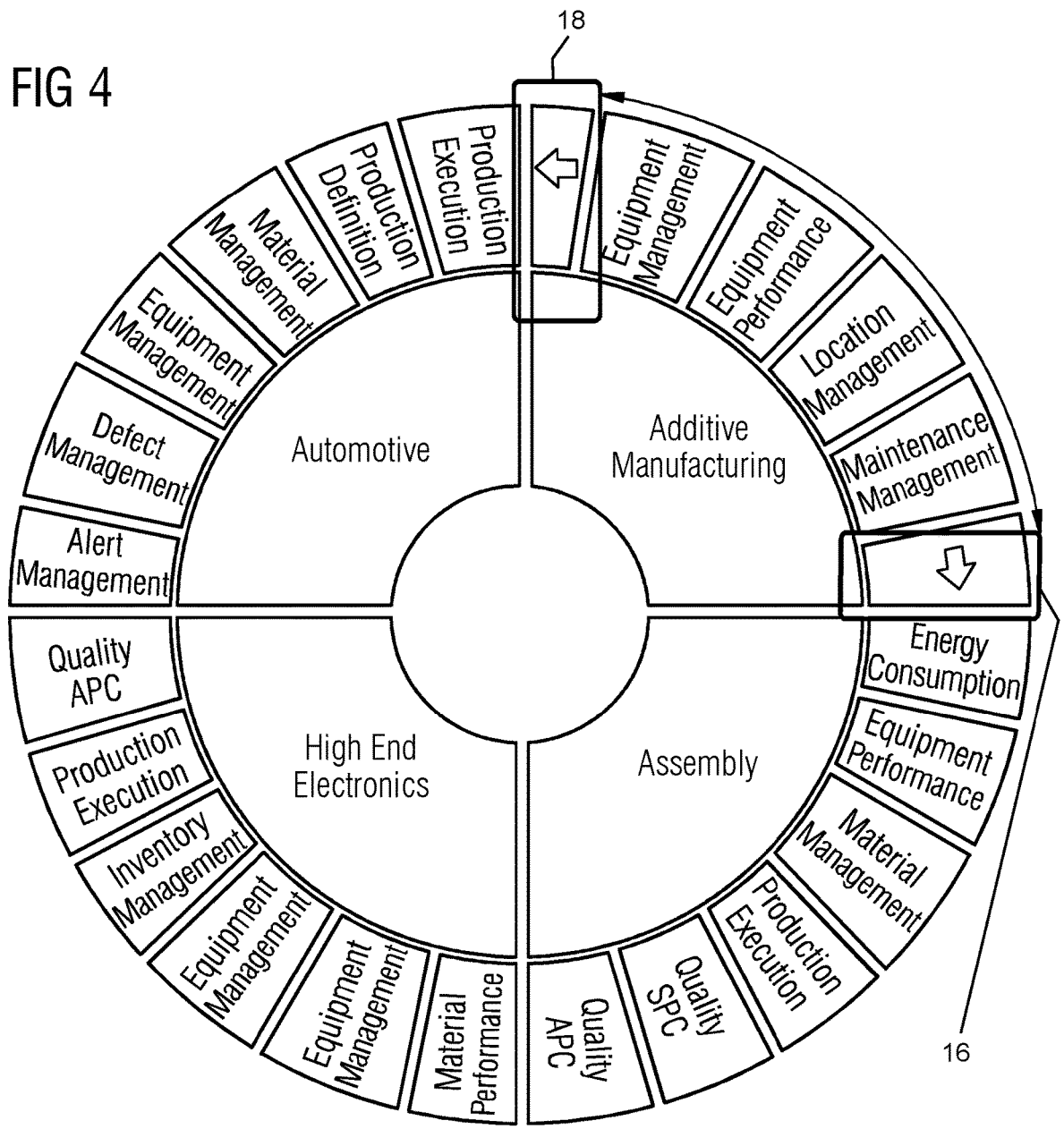
FIG. 4 is an illustration showing an example to scroll synchronously an internal ring and an external ring representing two levels of the data model hierarchy in the radial control based user interface.

On the screen of these devices, navigation actions are provided in the context of the radial control based UI 14 in order to scroll up and/or scroll down through the levels of the hierarchical data model. FIG. 4 represents the example of two arrows 16, 18 which allow to scroll within the same external ring. In order to maintain the data integrity in the radial control based UI 14, the internal ring is moved synchronously with the external ring.

The invention therefore provides a method to design the MOM Data Warehouse based on the user requirements without the need for additional technical/architectural data base design activities. The set of possible data that is considered relevant for the analysis purposes has been mapped into a hierarchical model based on the Industry classification 2 as shown in FIGS. 1, 3 and 5:

Level N: Industry Sector
Level N−1: Industry Niche
Level N−2: MES/MOM Functionality
Level N−3: MES/MOM Model This hierarchical model is characterized by multiple intermediate levels and a huge set of leaves.

The method of the invention manages the user interactions in the following way:

Drill down: The selection of a segment in the internal or external rings moves one level below in the hierarchy till the leafs are reached.

Drill up: The selection of the central area moves one level up in the hierarchy till the root is reached.

Horizontal scroll: In case one level of the hierarchy contains a set of data that exceed the rendering capabilities, the couple of clockwise and counterclockwise arrows 16, 18 can be used to display the other segments.

The selection of the leaf info is used to automatically define which entities of the MOM data model are part of the conceptual model of the MOM Data Warehouse and which is the MOM Data Warehouse physical structure.

In order to put a certain emphasis on some of the ring segments, the size and/or the position and/or the appearance of the separated ring segments in the internal ring and/or in the external ring can be adjusted in dependency from the relevance of the data represented by the respective ring segment. The relevance of the data can be identified by the evaluation of a data criteria, preferably data criteria linked to the number of sub-leaves in the hierarchical data model and/or data criteria linked to current status of the manufacturing process. Preferred embodiments of the afore-mentioned measure can be achieved when the relevance of the data is identified by the evaluation of a data criteria, preferably data criteria linked to the number of sub-leaves in the hierarchical data model and/or data criteria linked to current status of the manufacturing process and/or data criteria linked to the role of the user of the radial control based UI. Easy examples could be: the larger size of a separated ring segment for data that contains a high number of sub-leaves and/or the larger size of a separated ring segment for data that summarizes the OEE functionalities of a manufacturing process just completed and/or an amended color for a separated ring segment for data that is substantial to a technician doing the maintenance of a manufacturing line in a manufacturing facility.

The invention claimed is:

1. A method for configuring a manufacturing operation management (MOM) data warehouse and providing a user interface (UI) to the MOM data warehouse configuration, the MOM data warehouse forming a database for data handled within a manufacturing execution system, which comprises the steps of:
   mapping the data that has to be presented in the UI into a hierarchical data model being based on an industry classification of a manufacturing process controlled by the manufacturing execution system, the hierarchical data model having a number of levels;
   mapping the hierarchical data model into the UI being a radial control based UI, the radial control based UI having an internal rind of radially separated rind segments at a level N and an external rind of radially separated rind segments at a level N+1 or N−1;
   displaying in the radial control based UI at least two of the levels of the hierarchical data model;
   providing navigation actions within the radial control based UI in order to scroll up and/or scroll down through each of the levels of the hierarchical data model and specifically within a same level with the radial control based UI, wherein a specific control, being two arrows each disposed between two of the radially separated ring segments, which enable a user to scroll the internal ring or the external ring in a clockwise or counterclockwise direction, when a number of the separated ring segments to be displayed exceeds a maximum rendering capability thereby maintaining a data hierarchy when the internal ring and the external ring are kept synchronously; and
   identifying relevancy of the data on a same hierarchical level by an evaluation of a data criteria.

2. The method according to claim 1, which further comprises adjusting a size and/or a position and/or an appearance of the separated ring segments in the internal ring and/or in the external ring in dependency on a relevance of the data represented by a respective ring segment.

3. The method according to claim 1, which further comprises identifying the relevance of the data by an evaluation of the data criteria linked to a number of sub-leaves in the hierarchical data model and/or the data criteria linked to current status of the manufacturing process.

4. The method according to claim 1, which further comprises selecting the industry classification from the group consisting of automotive, electronics, mechanical assembly, aerospace, pharmaceuticals, mass manufacturing and food and beverage.

5. A non-transitory computer-readable medium having computer executable instructions for performing a method for configuring a manufacturing operation management (MOM) data warehouse and providing a user interface (UI) to the MOM data warehouse configuration, the MOM data warehouse forming a database for data handled within a manufacturing execution system, which comprises the steps of:

mapping the data that has to be presented in the UI into a hierarchical data model being based on an industry classification of a manufacturing process controlled by the manufacturing execution system, the hierarchical data model having a number of levels;

mapping the hierarchical data model into the UI being a radial control based UI, the radial control based UI having an internal ring of radially separated ring segments at a level N and an external ring of radially separated ring segments at a level N+1 or N−1, displaying in the radial control based UI at least two of the levels of the hierarchical data model;

providing navigation actions within the radial control based UI in order to scroll up and/or scroll down through each of the levels of the hierarchical data model and specifically within a same level with the radial control based UI, wherein a specific control, being two arrows each disposed between two of said radially separated ring segments, which enable a user to scroll the internal ring or the external ring in a clockwise or counterclockwise direction, when a number of the separated ring segments to be displayed exceeds a maximum rendering capability thereby maintaining a data hierarchy when the internal ring and the external ring are kept synchronously; and identifying relevancy of the data on a same hierarchical level by an evaluation of a data criteria.

* * * * *